US012223901B2

(12) United States Patent
Cho et al.

(10) Patent No.: US 12,223,901 B2

(45) Date of Patent: Feb. 11, 2025

(54) PIXEL AND DISPLAY DEVICE INCLUDING THE SAME

(71) Applicant: SAMSUNG DISPLAY CO., LTD., Yongin-si (KR)

(72) Inventors: Dae Youn Cho, Yongin-si (KR); Jong Woo Park, Yongin-si (KR); Jun Seok Oh, Yongin-si (KR); Yoon Suk Choi, Yongin-si (KR); Young Tae Choi, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/301,726

(22) Filed: Apr. 17, 2023

(65) Prior Publication Data

US 2023/0335058 A1 Oct. 19, 2023

(30) Foreign Application Priority Data

Apr. 18, 2022 (KR) ........................ 10-2022-0047725

(51) Int. Cl.

*G09G 3/32* (2016.01)
*G09G 3/3233* (2016.01)
*G09G 3/3258* (2016.01)

(52) U.S. Cl.

CPC ......... *G09G 3/3233* (2013.01); *G09G 3/3258* (2013.01); *G09G 2300/0819* (2013.01); *G09G 2300/0842* (2013.01); *G09G 2300/0861* (2013.01); *G09G 2310/0202* (2013.01); *G09G 2310/08* (2013.01); *G09G 2320/0233* (2013.01); *G09G 2320/0247* (2013.01)

(58) Field of Classification Search

CPC ............... G09G 3/3233; G09G 3/3258; G09G 2300/0819; G09G 2300/0842; G09G 2300/0861; G09G 2310/0202; G09G 2310/08; G09G 2320/0233; G09G 2320/0247; G09G 2310/0251; G09G 2310/0262; G09G 2340/0435; G09G 2300/0809; G09G 2310/0264; G09G 2330/028

See application file for complete search history.

(56) References Cited

U.S. PATENT DOCUMENTS 8,817,008 B2 8/2014 Park et al.
10,311,782 B2 6/2019 Rieutort-Louis et al.
10,319,306 B2 * 6/2019 Jeong .................. H10K 59/123

(Continued)

FOREIGN PATENT DOCUMENTS

KR 10-2010-0053233 5/2010
KR 10-2218315 2/2021
KR 10-2021-0137328 11/2021

OTHER PUBLICATIONS

Notice of Allowance dated Dec. 12, 2023 issued for the cross-referenced U.S. Appl. No. 18/066,981.

*Primary Examiner* — Ibrahim A Khan

(74) *Attorney, Agent, or Firm* — F. Chau & Associates, LLC

(57) ABSTRACT

A pixel of a display device may pre-charge a light emitting element in non-emission periods immediately before emission periods by varying a voltage level of an initialization voltage. As a result, a luminance non-uniformity phenomenon that may occur as the result of a deterioration deviation of the light emitting element may be removed or reduced.

16 Claims, 8 Drawing Sheets

(56) References Cited

U.S. PATENT DOCUMENTS

| | | | |
|---|---|---|---|
| 10,431,154 B2 | 10/2019 | Tsai et al. | |
| 10,546,529 B2 | 1/2020 | Kimura et al. | |
| 10,629,130 B2 | 4/2020 | Kim et al. | |
| 10,665,175 B2 | 5/2020 | Kim et al. | |
| 10,916,198 B2 | 2/2021 | Lin et al. | |
| 11,017,719 B2 | 5/2021 | Kim et al. | |
| 11,056,043 B2 | 7/2021 | Oh et al. | |
| 11,056,049 B2 | 7/2021 | Kim et al. | |
| 11,056,060 B2 | 7/2021 | Kim et al. | |
| 11,176,882 B2 | 11/2021 | Umezawa | |
| 11,176,883 B2 | 11/2021 | Na et al. | |
| 11,195,459 B2 | 12/2021 | Kobayashi | |
| 11,238,786 B2 | 2/2022 | Byun et al. | |
| 11,282,462 B2 | 3/2022 | Lin et al. | |
| 11,341,878 B2 | 5/2022 | Kim et al. | |
| 11,348,512 B2 | 5/2022 | Kim et al. | |
| 11,367,389 B2 | 6/2022 | Xu | |
| 11,423,834 B2 | 8/2022 | Park et al. | |
| 11,450,280 B2 | 9/2022 | Kim et al. | |
| 11,508,309 B2 | 11/2022 | Lin et al. | |
| 11,508,320 B2 | 11/2022 | Kim et al. | |
| 11,651,736 B2 | 5/2023 | Lin et al. | |
| 11,682,344 B2 | 6/2023 | Kim et al. | |
| 11,710,432 B2 | 7/2023 | Kim et al. | |
| 11,869,412 B2 | 1/2024 | In et al. | |
| 2010/0079361 A1* | 4/2010 | Lee | G09G 3/3233 345/77 |
| 2015/0294624 A1* | 10/2015 | Liu | G09G 3/3233 345/77 |
| 2015/0317931 A1* | 11/2015 | Tseng | G09G 3/3233 345/78 |
| 2016/0379570 A1* | 12/2016 | Lee | G09G 3/3233 345/214 |
| 2017/0294162 A1* | 10/2017 | Hu | G09G 3/3233 |
| 2018/0261163 A1* | 9/2018 | Hyun | G09G 3/003 |
| 2019/0164485 A1* | 5/2019 | Tomitani | G09G 3/3233 |
| 2020/0074931 A1* | 3/2020 | Yang | G09G 3/3266 |
| 2020/0168147 A1 | 5/2020 | Na et al. | |
| 2020/0226978 A1 | 7/2020 | Lin et al. | |
| 2021/0005138 A1 | 1/2021 | Umezawa | |
| 2021/0020109 A1 | 1/2021 | Lin et al. | |
| 2021/0027696 A1* | 1/2021 | Kim | G09G 3/3233 |
| 2021/0125557 A1 | 4/2021 | Na | |
| 2021/0367122 A1 | 11/2021 | Park et al. | |
| 2022/0180812 A1 | 6/2022 | Lin et al. | |
| 2022/0199016 A1 | 6/2022 | Kim et al. | |
| 2022/0208088 A1 | 6/2022 | Kim et al. | |
| 2022/0383813 A1 | 12/2022 | Wang | |
| 2023/0115779 A1 | 4/2023 | Kim et al. | |
| 2023/0142259 A1 | 5/2023 | Yen et al. | |
| 2023/0206858 A1 | 6/2023 | Kim et al. | |
| 2023/0217710 A1 | 7/2023 | Jinta | |
| 2023/0225160 A1 | 7/2023 | Cho et al. | |
| 2023/0230543 A1 | 7/2023 | Kim et al. | |
| 2023/0237965 A1 | 7/2023 | Lin et al. | |
| 2023/0245619 A1 | 8/2023 | Yoon et al. | |

* cited by examiner

PIXEL AND DISPLAY DEVICE INCLUDING THE SAME

CROSS-REFERENCE TO RELATED APPLICATIONS

This application claims priority under 35 U.S.C. § 119 to Korean Patent Application No. 10-2022-0047725, filed on Apr. 18, 2022, the disclosure of which is incorporated by reference herein in its entirety.

TECHNICAL FIELD

Embodiments of the present disclosure relate to a pixel and a display device including the same.

DISCUSSION OF RELATED ART

A display device includes a plurality of pixels. Each of the pixels includes a plurality of transistors, and a light emitting element and a capacitor electrically connected to the transistors. The transistors generate a driving current based on signals provided through signal lines, and the light emitting element emits light based on the driving current.

SUMMARY

According to embodiments of the present disclosure, a pixel and a display device including the same are provided, in which a luminance non-uniformity phenomenon that may occur as a result of a deterioration deviation of a light emitting element may be removed or reduced.

According to embodiments of the present disclosure, a pixel may include a light emitting element, a first transistor connected between a first node and a second node and generating a driving current flowing from a first power line providing a first power voltage to a second power line providing a second power voltage through the light emitting element, a second transistor connected between a data line and the first node and turned on in response to a fourth scan signal supplied to a fourth scan line, a third transistor connected between the second node and a third node corresponding to a gate electrode of the first transistor and turned on in response to a third scan signal supplied to a third scan line, a fourth transistor connected between the third node and a third power line providing a third power voltage and turned on in response to a second scan signal supplied to a second scan line, a fifth transistor connected between the first power line and the first node and turned off in response to an emission control signal supplied to an emission control line, a sixth transistor connected between the second node and a fourth node corresponding to a first electrode of the light emitting element and turned off in response to the emission control signal, and a seventh transistor connected between the fourth node and a fourth power line providing a fourth power voltage and turned on in response to a first scan signal supplied to a first scan line. During one frame period, the first scan signal may be supplied to the first scan line at least twice, and in the one frame period, a voltage level of the fourth power voltage may vary.

In an embodiment, the pixel may further include an eighth transistor connected between the first node and a fifth power line providing a fifth power voltage and turned on in response to the first scan signal.

In an embodiment, the one frame period may include a first driving period in which the fourth scan signal is supplied to the second transistor, a data signal supplied to the data line is written, and the first scan signal is supplied to the eighth transistor, and a second driving period in which the fourth scan signal is not supplied to the second transistor and the first scan signal is supplied to the eighth transistor.

In an embodiment, the first driving period may include a first period in which the third scan signal is supplied to the third transistor and the first scan signal is supplied to the seventh transistor and the eighth transistor, a second period in which the second scan signal is supplied to the fourth transistor after the first period, a third period in which the third scan signal is supplied to the third transistor and the fourth scan signal is supplied to the second transistor after the second period, and a fourth period in which the first scan signal is supplied to the seventh transistor and the eighth transistor after the third period.

In an embodiment, the fourth power voltage may have a first voltage level in the first to third periods and a second voltage level different from the first voltage level in the fourth period.

In an embodiment, the second voltage level may be greater than the first voltage level.

In an embodiment, the second voltage level may be less than a value obtained by adding a threshold voltage of the light emitting element and the second power voltage.

In an embodiment, a width of the third scan signal may be greater than a width of the first scan signal in the first period.

In an embodiment, the second driving period may include a fifth period in which the first scan signal is supplied to the seventh transistor and the eighth transistor.

In an embodiment, the fourth power voltage may be maintained as a first voltage level during the second driving period.

In an embodiment, the second driving period may further include a sixth period in which the first scan signal is supplied to the seventh transistor and the eighth transistor after the fifth period.

In an embodiment, the fourth power voltage may have a first voltage level in the fifth period and a second voltage level different from the first voltage level in the sixth period.

According to embodiments of the present disclosure, a display device may include a pixel connected to first to fourth scan lines, an emission control line, a data line, and first to fifth power lines, a scan driver configured to supply first to fourth scan signals to the first to fourth scan lines, respectively, an emission driver configured to supply an emission control signal to the emission control line, a data driver configured to supply a data signal to the data line, and a power supply configured to supply first to fifth power voltages to the first to fifth power lines, respectively. The pixel may include a light emitting element, a first transistor connected between a first node and a second node and generating a driving current flowing from the first power line to the second power line through the light emitting element, a second transistor connected between the data line and the first node and turned on in response to the fourth scan signal, a third transistor connected between the second node and a third node corresponding to a gate electrode of the first transistor and turned on in response to the third scan signal, a fourth transistor connected between the third node and the third power line and turned on in response to the second scan signal, a fifth transistor connected between the first power line and the first node and turned off in response to the emission control signal, a sixth transistor connected between the second node and a fourth node corresponding to a first electrode of the light emitting element and turned off in response to the emission control signal, and a seventh transistor connected between the fourth node and the fourth power line and turned on in response to the first scan signal. The scan driver may supply the first scan signal to the first scan line at least twice during one frame period, and the power supply may vary a voltage level of the fourth power voltage in the one frame period.

In an embodiment, the pixel may further include an eighth transistor connected between the first node and the fifth power line and turned on in response to the first scan signal.

In an embodiment, the one frame period may include a first driving period and a second driving period. In the first driving period, the scan driver may supply the first scan signal through the first scan line and supplies the fourth scan signal through the fourth scan line, and in the second driving period, the scan driver may supply the first scan signal through the first scan line and may not supply the fourth scan signal.

In an embodiment, the first driving period may include a first period in which the scan driver supplies the first scan signal to the first scan line and supplies the third scan signal to the third scan line, a second period in which the scan driver supplies the second scan signal to the second scan line after the first period, a third period in which the scan driver supplies the third scan signal to the third scan line and the fourth scan signal to the fourth scan line after the second period, and a fourth period in which the scan driver supplies the first scan signal to the first scan line after the third period.

In an embodiment, the power supply may supply the fourth power voltage having a first voltage level to the fourth power line in the first to third periods, and supply the fourth power voltage having a second voltage level different from the first voltage level to the fourth power line in the fourth period.

In an embodiment, the second voltage level may be greater than the first voltage level.

In an embodiment, the second driving period may include a fifth period in which the scan driver supplies the first scan signal to the first scan line. The power supply may supply the fourth power voltage having a first voltage level to the fourth power line in the fifth period.

In an embodiment, the second driving period may further include a sixth period in which the scan driver supplies the first scan signal to the first scan line after the fifth period. The power supply may supply the fourth power voltage having a second voltage level different from the first voltage level to the fourth power line in the sixth period.

BRIEF DESCRIPTION OF THE DRAWINGS

The above and other features of the present disclosure will become more apparent by describing in detail embodiments thereof with reference to the accompanying drawings, in which.

DETAILED DESCRIPTION OF THE EMBODIMENTS

Figure 1:
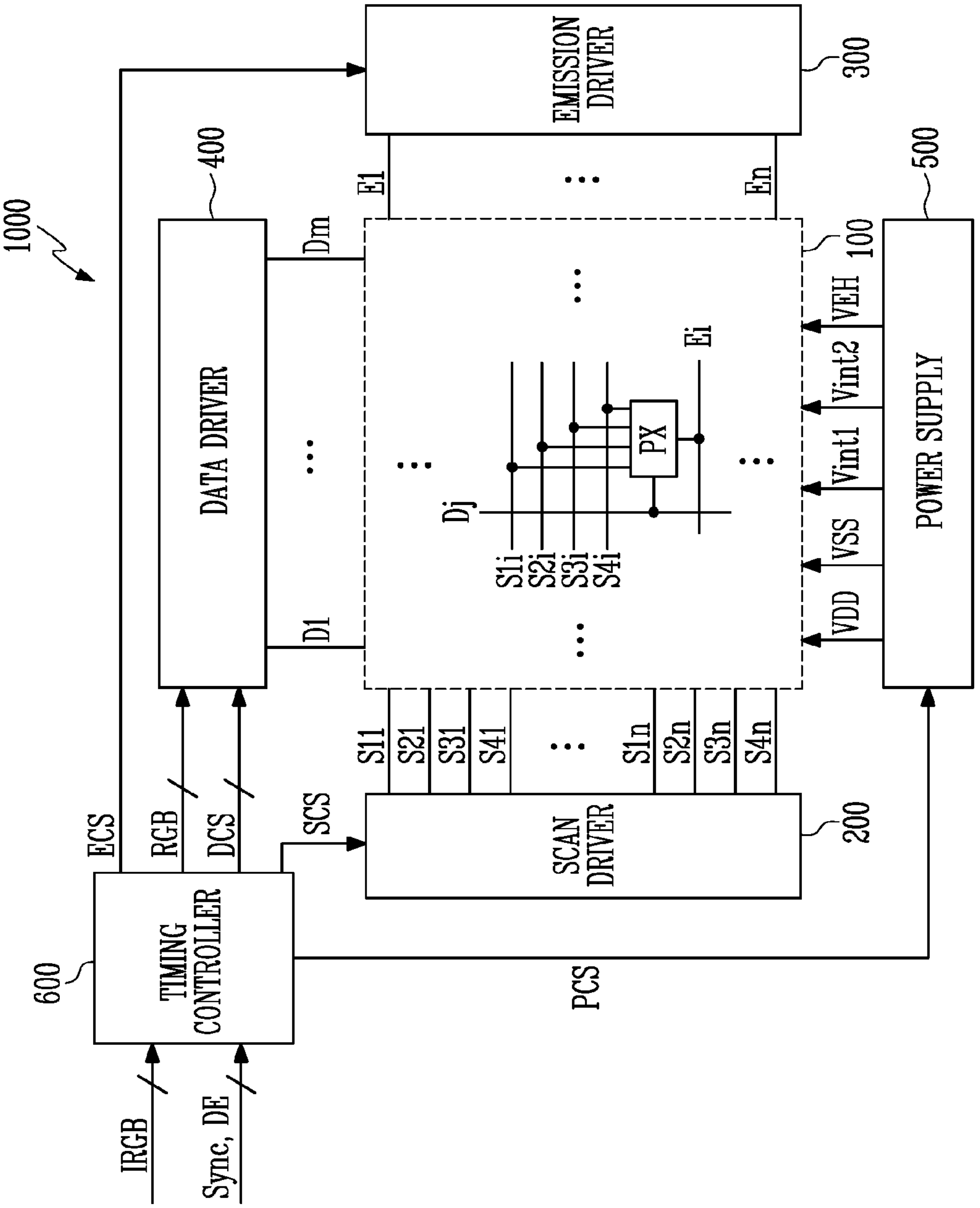
FIG. 1 is a block diagram illustrating a display device according to embodiments of the present disclosure.

Embodiments of the present disclosure will be described more fully hereinafter with reference to the accompanying drawings. Like reference numerals may refer to like elements throughout the accompanying drawings.

It will be understood that the terms “first,” “second,” “third,” etc. are used herein to distinguish one element from another, and the elements are not limited by these terms. Thus, a “first” element in an embodiment may be described as a “second” element in another embodiment.

It should be understood that descriptions of features or aspects within each embodiment should typically be considered as available for other similar features or aspects in other embodiments, unless the context clearly indicates otherwise.

As used herein, the singular forms “a”, “an” and “the” are intended to include the plural forms as well, unless the context clearly indicates otherwise.

It will be understood that when a component is referred to as being “on”, “connected to”, “coupled to”, or “adjacent to” another component, it can be directly on, connected, coupled, or adjacent to the other component, or intervening components may be present. It will also be understood that when a component is referred to as being “between” two components, it can be the only component between the two components, or one or more intervening components may also be present. Other words used to describe the relationships between components should be interpreted in a like fashion.

Herein, when two or more elements or values are described as being substantially the same as or about equal to each other, it is to be understood that the elements or values are identical to each other, the elements or values are equal to each other within a measurement error, or if measurably unequal, are close enough in value to be functionally equal to each other as would be understood by a person having ordinary skill in the art. For example, the term “about” as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, “about” may mean within one or more standard deviations as understood by one of the ordinary skill in the art. Further, it is to be understood that while parameters may be described herein as having “about” a certain value, according to exemplary embodiments, the parameter may be exactly the certain value or approximately the certain value within a measurement error as would be understood by a person having ordinary skill in the art. Other uses of these terms and similar terms to describe the relationships between components should be interpreted in a like fashion.

FIG. 1 is a block diagram illustrating a display device according to embodiments of the present disclosure.

Referring to FIG. 1, the display device 1000 may include a display panel 100, a scan driver 200, an emission driver 300, a data driver 400, a power supply 500, and a timing controller 600.

The display device 1000 may display an image at various frame frequencies (refresh rates, driving frequencies, or screen reproduction rates) according to a driving condition. The frame frequency is a frequency at which a data voltage is substantially written to a driving transistor of a pixel PX during one second. For example, the frame frequency is also referred to as a screen scan rate or a screen reproduction frequency, and indicates a frequency at which a display screen is reproduced during one second.

In an embodiment, an output frequency of a data signal of the data driver 400 and/or an output frequency of a scan signal (for example, a fourth scan signal) supplied to a scan line (for example, a fourth scan line) to supply the data signal may be changed in response to the frame frequency. For example, a frame frequency for driving a moving image may be a frequency of about 60 Hz or higher (for example, about 60 Hz, about 120 Hz, about 240 Hz, about 360 Hz, about 480 Hz, etc.). For example, when the frame frequency is 60 Hz, the fourth scan signal may be supplied to each horizontal line (pixel row) 60 times during one second.

In an embodiment, the display device 1000 may adjust output frequencies of the scan driver 200 and the emission driver 300 and the output frequency of the data driver 400 corresponding to the output frequencies of the scan driver 200 and the emission driver 300, according to a driving condition. For example, the display device 1000 may display an image in response to various frame frequencies of about 1 Hz to about 120 Hz. However, this is an example, and the present disclosure is not limited thereto. For example, according to embodiments, the display device 1000 may display an image at a frame frequency of about 120 Hz or higher (for example, about 240 Hz or about 480 Hz).

According to embodiments, the display device 1000 may operate at various frame frequencies. In a case of low-frequency driving, an image defect such as flicker may be visually recognized due to current leakage inside a pixel. In addition, an afterimage such as image drag may be visually recognized according to a bias state change of a driving transistor by driving at various frame frequencies, and a response speed change due to, for example, a threshold voltage shift according to a hysteresis characteristic change.

To increase image quality, one frame period may include a plurality of non-emission periods and emission periods according to the frame frequency. For example, an initial non-emission period and emission period (for example, a first non-emission period and a first emission period) of one frame may be defined as a first driving period, and a subsequent non-emission period and emission period (for example, a second non-emission period and a second emission period) may be defined as a second driving period.

For example, a data signal for displaying an image may be substantially written to the pixel PX in the first driving period, and an on-bias may be applied to the driving transistor of the pixel PX in the second driving period.

The display panel 100 may include scan lines S11 to S1*n*, S21 to S2*n*, S31 to S3*n*, and S41 to S4*n*, emission control lines E1 to En, and data lines D1 to Dm, and may include the pixels PX connected to the scan lines S11 to S1*n*, S21 to S2*n*, S31 to S3*n*, and S41 to S4*n*, emission control lines E1 to En, and data lines D1 to Dm (where, m and n are integers greater than 1). Each of the pixels PX may include a driving transistor and a plurality of switching transistors. The pixels PX may receive a first power voltage VDD, a second power voltage VSS, a third power voltage Vint1 (for example, a first initialization voltage), a fourth power voltage Vint2 (for example, a second initialization voltage), and a fifth power voltage VEH (for example, a bias voltage) from the power supply 500.

In an embodiment of the present disclosure, signal lines connected to the pixel PX may be variously set in response to a circuit structure of the pixel PX.

The timing controller 600 may receive input image data IRGB and control signals Sync and DE from a host system such as, for example, an application processor (AP) through a predetermined interface. The timing controller 600 may control driving timings of the scan driver 200, the emission driver 300, and the data driver 400.

The timing controller 600 may generate a first control signal SCS, a second control signal ECS, a third control signal DCS, and a fourth control signal PCS based on the input image data IRGB, a synchronization signal Sync (for example, a vertical synchronization signal, a horizontal synchronization signal, etc.), a data enable signal DE, a clock signal, etc. The first control signal SCS may be supplied to the scan driver 200, the second control signal ECS may be supplied to the emission driver 300, the third control signal DCS may be supplied to the data driver 400, and the fourth control signal PCS may be supplied to the power supply 500. The timing controller 600 may rearrange the input image data IRGB and supply the rearranged input image data IRGB to the data driver 400.

The scan driver 200 may receive the first control signal SCS from the timing controller 600, and may supply a first scan signal, a second scan signal, a third scan signal, and a fourth scan signal to first scan lines S11 to S1*n*, second scan lines S21 to S2*n*, third scan lines S31 to S3*n*, and fourth scan lines S41 to S4*n*, respectively, based on the first control signal SCS.

The first to fifth scan signals may be set to a gate-on voltage (for example, a low voltage) corresponding to a type of a transistor to which corresponding scan signals are supplied. The transistor receiving the scan signal may be set to a turn-on state when the scan signal is supplied. For example, a gate-on voltage of a scan signal supplied to a P-channel metal-oxide semiconductor (PMOS) transistor may be a logic low level, and a gate-on voltage of a scan signal supplied to an N-channel metal-oxide semiconductor (NMOS) transistor may be a logic high level. Hereinafter, the phrase "the scan signal is supplied" may be understood as meaning that the scan signal is supplied at a logic level that turns on a transistor controlled by the scan signal.

The emission driver 300 may supply an emission control signal to the emission control lines E1 to En based on the second control signal ECS. For example, the emission control signal may be sequentially supplied to the emission control lines E1 to En.

The emission control signal may be set to a gate-off voltage (for example, a high voltage). The transistor receiving the emission control signal may be turned off when the emission control signal is supplied, and may be set to a turn-on state in other cases. Hereinafter, of the phrase "the emission control signal is supplied" may be understood as meaning that the emission control signal is supplied at a logic level that turns off a transistor controlled by the emission control signal.

In FIG. 1, each of the scan driver 200 and the emission driver 300 is shown as a single configuration for convenience of description. However, the present disclosure is not limited thereto. For example, according to embodiments, the scan driver 200 may include a plurality of scan drivers that respectively supply at least one of the first to fourth scan signals. In addition, at least a portion of the scan driver 200 and the emission driver 300 may be integrated into one driving circuit according to embodiments.

The data driver 400 may receive the third control signal DCS and image data RGB from the timing controller 600. The data driver 400 may convert digital image data RGB into an analog data signal (for example, a data voltage). The data driver 400 may supply a data signal to the data lines D1 to Dm in response to the third control signal DCS. At this time, the data signal supplied to the data lines D1 to Dm may be supplied to be synchronized with the fourth scan signal supplied to the fourth scan lines S41 to S4*n*.

The power supply 500 may supply the first power voltage VDD and the second power voltage VSS for driving of the pixel PX to the display panel 100. A voltage level of the second power voltage VSS may be lower than a voltage level of the first power voltage VDD. For example, the first power voltage VDD may be a positive voltage, and the second power voltage VSS may be a negative voltage.

The power supply 500 may supply the third power voltage Vint1 (hereinafter referred to as a first initialization voltage), the fourth power voltage Vint2 (hereinafter referred to as a second initialization voltage), and the fifth power voltage (hereinafter referred to as a bias voltage) to the display panel 100.

An initialization voltage (for example, the first initialization voltage Vint1 and the second initialization voltage Vint2) may be a power voltage that initializes the pixel PX. For example, the driving transistor and/or a light emitting element included in the pixel PX may be initialized by the initialization voltage. For example, the initialization voltage may include the first initialization voltage Vint1 and the second initialization voltage Vint2 output at different voltage levels.

In an embodiment, the power supply 500 may vary a voltage level of the second initialization voltage Vint2 within one frame period and supply the second initialization voltage Vint2 to the display panel 100. For example, the power supply 500 may vary the voltage level of the second initialization voltage Vint2 in the non-emission period (for example, the first non-emission period) of the first driving period of one frame period. As another example, the power supply 500 may vary the voltage level of the second initialization voltage Vint2 in the non-emission period (for example, the second non-emission period) of the second driving period of one frame period. Accordingly, as the light emitting element (for example, a parasitic capacitor of the light emitting element) included in the pixel PX is precharged by the second initialization voltage Vint2 of which the voltage level is varied (for example, the voltage level is varied from a first voltage level to a second voltage level) immediately before the emission period, the light emitting element may emit light with a fast response speed, and a luminance non-uniformity phenomenon according to deterioration of the light emitting element may be accounted for (e.g., luminance non-uniformity may be reduced or removed).

The bias voltage VEH may be a voltage for supplying a predetermined bias to a source electrode and/or a drain electrode of the driving transistor included in the pixel PX. For example, the bias voltage VEH may be a positive voltage. However, a voltage level of the bias voltage VEH is not limited thereto. For example, according to embodiments, the bias voltage VEH may be a negative voltage.

Figure 2:
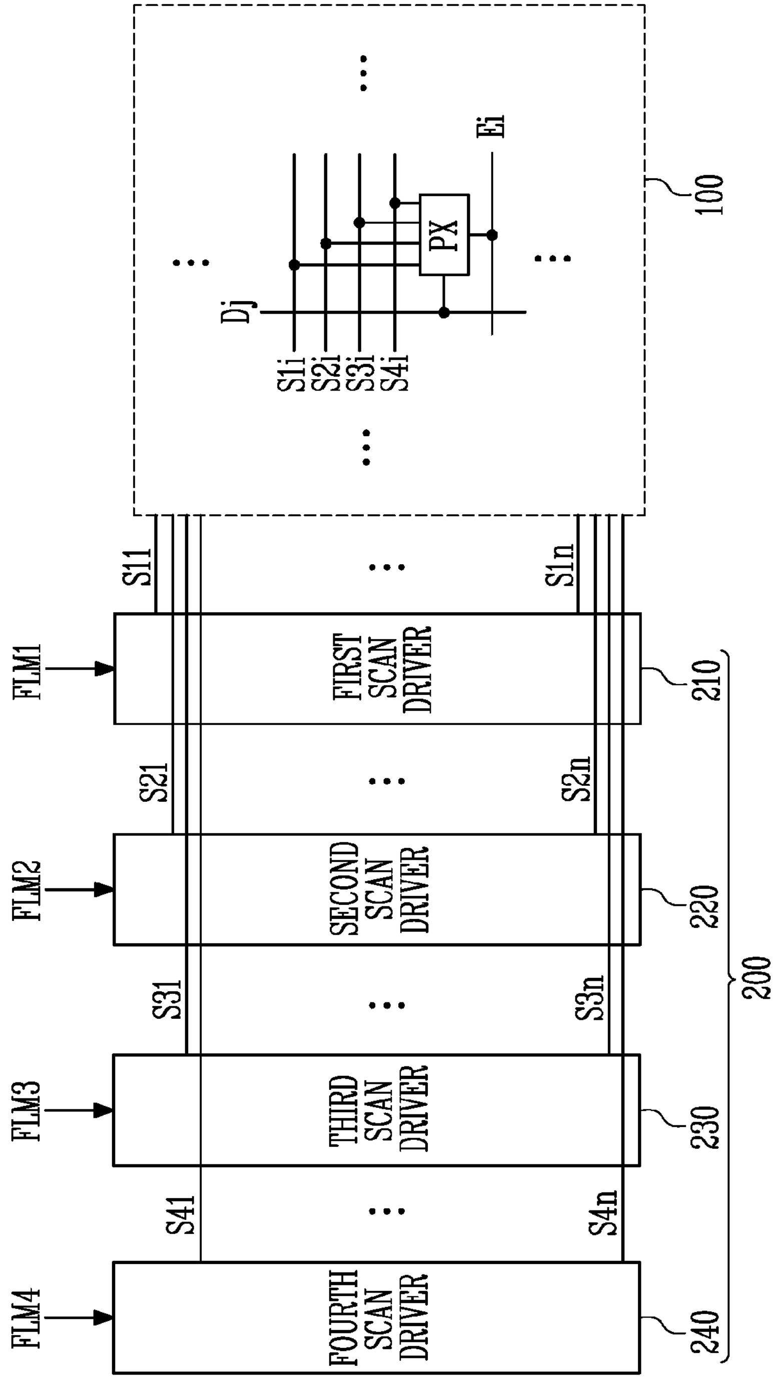
FIG. 2 is a diagram illustrating an example of a scan driver included in the display device of FIG. 1.

FIG. 2 is a diagram illustrating an example of the scan driver included in the display device of FIG. 1.

Referring to FIGS. 1 and 2, the scan driver 200 may include a first scan driver 210, a second scan driver 220, a third scan driver 230, and a fourth scan driver 240.

The first control signal SCS may include first to fourth scan start signals FLM1 to FLM4. The first to fourth scan start signals FLM1 to FLM4 may be supplied to the first to fourth scan drivers 210, 220, 230, and 240, respectively.

A width, a supply timing, etc. of the first to fourth scan start signals FLM1 to FLM4 may be determined according to a driving condition and a frame frequency of the pixel PX. The first to fourth scan signals may be output based on the first to fourth scan start signals FLM1 to FLM4, respectively. For example, a signal width of at least one of the first to fourth scan signals may be different from a signal width of the remaining scan signals.

The first scan driver 210 may sequentially supply the first scan signal to the first scan lines S11 to S1*n* in response to the first scan start signal FLM1. The second scan driver 220 may sequentially supply the second scan signal to the second scan lines S21 to S2*n* in response to the second scan start signal FLM2. The third scan driver 230 may sequentially supply the third scan signal to the third scan lines S31 to S3*n* in response to the third scan start signal FLM3. The fourth scan driver 240 may sequentially supply the fourth scan signal to the fourth scan lines S41 to S4*n* in response to the fourth scan start signal FLM4.

Figure 3:
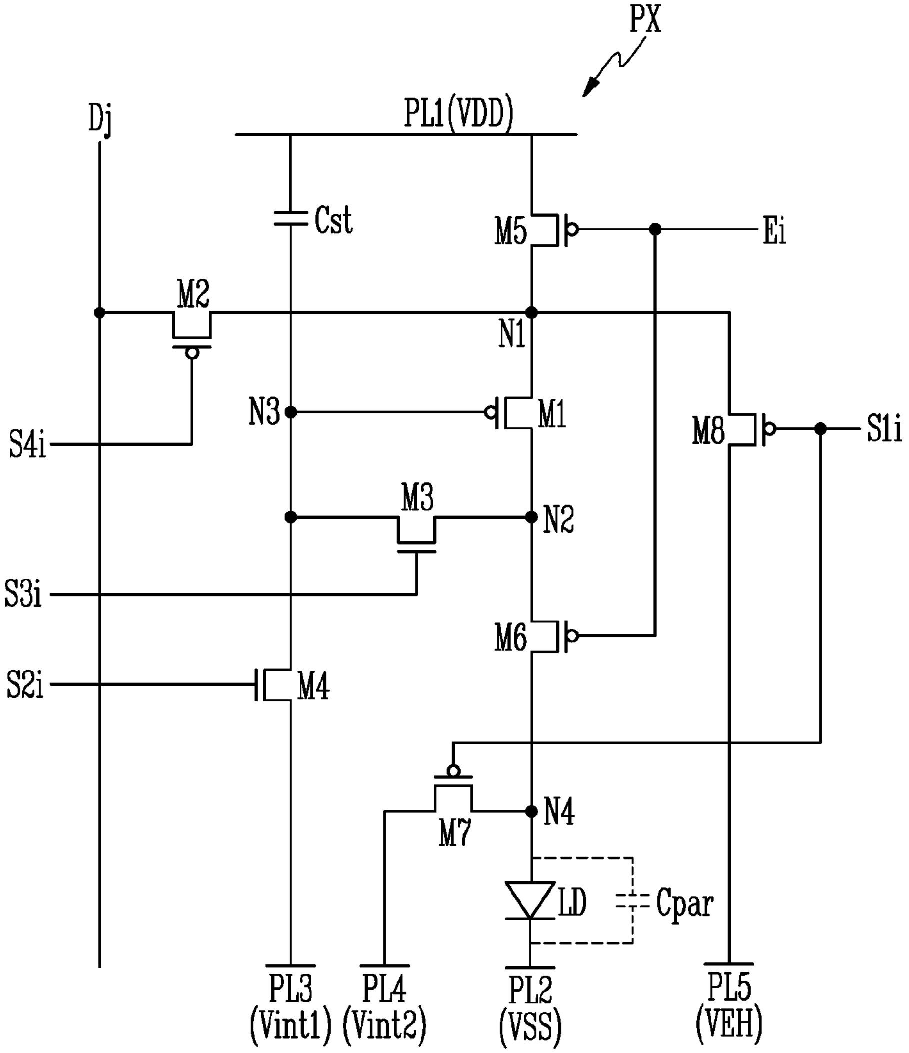
FIG. 3 is a circuit diagram illustrating an example of a pixel included in the display device of FIG. 1.

FIG. 3 is a circuit diagram illustrating an example of a pixel included in the display device of FIG. 1.

In FIG. 3, the pixel PX positioned on an i-th horizontal line (or an i-th pixel row) and connected to a j-th data line Dj is shown for convenience of description (where, i and j are positive integers). The pixel PX shown in FIG. 3 may be substantially the same as the pixel PX of FIG. 1. According to embodiments of the present disclosure, a plurality of pixels PX having the configuration shown in FIG. 3 may be implemented as a plurality of pixels PX in the display device 1000 of FIG. 1.

Referring to FIGS. 1 and 3, the pixel PX may include a light emitting element LD, first to eighth transistors M1 to M8, and a first capacitor Cst (for example, a storage capacitor).

A first electrode (an anode electrode or a cathode electrode) of the light emitting element LD may be connected to a fourth node N4 (or the sixth transistor M6), and a second electrode (a cathode electrode or an anode electrode) may be connected to a second power line PL2 transmitting the second power voltage VSS. The light emitting element LD may generate light of a predetermined luminance in response to a current amount (driving current) supplied from the first transistor M1.

The second power line PL2 may have a line shape, but is not limited thereto. For example, the second power line PL2 may be a conductive layer of a conductive plate shape.

In an embodiment, the light emitting element LD may be a light emitting diode. For example, in an embodiment, the light emitting element LD may be an organic light emitting diode including an organic light emitting layer. In an embodiment, the light emitting element LD may be an inorganic light emitting diode formed of an inorganic material, such as, for example, a micro light emitting diode (LED) or a quantum dot light emitting diode. In an embodiment, the light emitting element LD may be a light emitting element configured of an organic material and an inorganic material in combination.

According to embodiments, in FIG. 3, the pixel PX includes a single light emitting element LD. However, but the present disclosure is not limited thereto. For example, in an embodiment, the pixel PX may include a plurality of light emitting elements, and the plurality of light emitting elements may be connected in series, in parallel, or in series-parallel each other. For example, the light emitting element LD may have a shape in which the plurality of light emitting elements (for example, organic light emitting elements and/or inorganic light emitting elements) are connected in series, in parallel, or in series-parallel between the second power line PL2 and the fourth node N4.

A first electrode of the first transistor M1 (or a driving transistor) may be connected to a first node N1, and a second electrode may be connected to a second node N2. A gate electrode of the first transistor M1 may be connected to a third node N3. The first transistor M1 may control the driving current (for example, a current amount of the driving current) flowing from a first power line PL1 providing the first power voltage VDD to the second power line PL2 providing the second power voltage VSS via the light emitting element LD in response to a voltage of the third node N3. To this end, the first power voltage VDD may be set to a voltage higher than the second power voltage VSS. For example, the first power voltage VDD may be a positive voltage, and the second power voltage VSS may be a negative voltage.

The second transistor M2 may be connected between the j-th data line Dj (hereinafter referred to as a data line) and the first node N1. A gate electrode of the second transistor M2 may be connected to an i-th fourth scan line S4*i* (hereinafter referred to as a fourth scan line). The second transistor M2 may be turned on when the fourth scan signal is supplied to the fourth scan line S4*i* to electrically connect the data line Dj and the first node N1.

The third transistor M3 may be connected between the second electrode (for example, the second node N2) and the gate electrode (for example, the third node N3) of the first transistor M1. A gate electrode of the third transistor M3 may be connected to an i-th third scan line S3*i* (hereinafter referred to as a third scan line). The third transistor M3 may be turned on when the third scan signal is supplied to the third scan line S3*i* to electrically connect the second electrode and the gate electrode of the first transistor M1 (for example, the second node N2 and the third node N3). That is, a timing at which the second electrode (for example, the drain electrode) and the gate electrode of the first transistor M1 are connected may be controlled by the third scan signal. When the third transistor M3 is turned on, the first transistor M1 may be connected in a diode form.

The fourth transistor M4 may be connected between the third node N3 and a third power line PL3 providing the first initialization voltage Vint1. A gate electrode of the fourth transistor M4 may be connected to an i-th second scan line S2*i* (hereinafter referred to as a second scan line). The fourth transistor M4 may be turned on when the second scan signal is supplied to the second scan line S2*i* to supply the first initialization voltage Vint1 to the third node N3. Here, the first initialization voltage Vint1 may be set to a voltage lower than a lowest level of the data signal supplied to the data line Dj.

The fourth transistor M4 may be turned on by the supply of the second scan signal, and thus, a voltage of the gate electrode (or the third node N3) of the first transistor M1 may be initialized to the first initialization voltage Vint1.

The fifth transistor M5 may be connected between the first power line PL1 and the first node N1. A gate electrode of the fifth transistor M5 may be connected to an i-th emission control line Ei (hereinafter referred to as an emission control line). The fifth transistor M5 may be turned off when the emission control signal is supplied to the emission control line Ei, and may be turned on in other cases. When the fifth transistor M5 is turned on, the first node N1 may be electrically connected to the first power line PL1.

The sixth transistor M6 may be connected between the second electrode (or the second node N2) of the first transistor M1 and the first electrode (or the fourth node N4) of the light emitting element LD. A gate electrode of the sixth transistor M6 may be connected to the emission control line Ei. The sixth transistor M6 may be controlled substantially identically to the fifth transistor M5. When the sixth transistor M6 is turned on, the second node N2 and the fourth node N4 may be electrically connected.

In FIG. 3, the fifth transistor M5 and the sixth transistor M6 are connected to the same emission control line Ei, but this is an example, and the present disclosure is not limited thereto. For example, according to embodiments of the present disclosure, the fifth transistor M5 and the sixth transistor M6 may be respectively connected to separate emission control lines to which different emission control signals are supplied.

The seventh transistor M7 may be connected between the first electrode (or the fourth node N4) of the light emitting element LD and a fourth power line PL4 providing the second initialization voltage Vint2. In an embodiment, a gate electrode of the seventh transistor M7 may be connected to an i-th first scan line S1*i* (hereinafter referred to as a first scan line). The seventh transistor M7 may be turned on when the first scan signal is supplied to the first scan line S1*i* to supply the second initialization voltage Vint2 to the fourth node N4 (for example, the first electrode of the light emitting element LD).

In an embodiment, the voltage level of the second initialization voltage Vint2 may vary within one frame period. For example, in the first non-emission period of the first driving period of one frame period, the voltage level of the second initialization voltage Vint2 may vary from the first voltage level to the second voltage level higher than the first voltage level. As another example, in the second non-emission period of the second driving period of one frame period, the voltage level of the second initialization voltage Vint2 may vary from the first voltage level to the second voltage level higher than the first voltage level.

In an embodiment, when the first scan signal is supplied in a period in which the second initialization voltage Vint2 has the first voltage level, the second initialization voltage having the first voltage level Vint2 may be applied to the first electrode of the light emitting element LD. In this case, a second capacitor Cpar (for example, the parasitic capacitor of the light emitting element LD) may be discharged. As a residual voltage charged in the parasitic capacitor Cpar of the light emitting element LD is discharged (removed), unintentional minute light emission may be prevented or reduced. Therefore, black expression ability of the pixel PX may be increased.

According to embodiments, a voltage level of the first initialization voltage Vint1 and a first voltage level of the second initialization voltage Vint2 may have different voltage levels. That is, a voltage for initializing the third node N3 and a voltage for initializing the fourth node N4 may be differently set.

In low-frequency driving in which a length of one frame period is increased, when the first initialization voltage Vint1 supplied to the third node N3 is excessively low, since a strong on-bias is applied to the first transistor M1, a threshold voltage of the first transistor M1 in a corresponding frame period may be shifted. Such a hysteresis characteristic may cause a flicker phenomenon in the low-frequency driving. Therefore, in a low-frequency driving display device, the first initialization voltage Vint1 higher than the second power voltage VSS may be utilized.

However, when the first voltage level of the second initialization voltage Vint2 supplied to the fourth node N4 for initialization of the light emitting element LD becomes higher than a predetermined reference, a voltage of the parasitic capacitor Cpar of the light emitting element LD may not be discharged and instead may be charged. Therefore, the first voltage level of the second initialization voltage Vint2 is set to be sufficiently low to discharge the voltage of the parasitic capacitor Cpar of the light emitting element LD. For example, in consideration of a threshold voltage of the light emitting element LD, the first voltage level of the second initialization voltage Vint2 may be set so that the first voltage level of the second initialization voltage Vint2 is lower than a value obtained by adding the threshold voltage of the light emitting element LD and the second power voltage VSS.

However, this is an example, and the present disclosure is not limited thereto. For example, according to embodiments of the present disclosure, the voltage level of the first initialization voltage Vint1 and the voltage level of the second initialization voltage Vint2 may be variously set. For example, the voltage level of the first initialization voltage Vint1 and the first voltage level of the second initialization voltage Vint2 may be substantially the same in an embodiment.

In an embodiment, when the first scan signal is supplied in a period in which the second initialization voltage Vint2 has the second voltage level, the second initialization voltage Vint2 having the second voltage level may be supplied to the first electrode of the light emitting element LD. In this case, the light emitting element LD (for example, the parasitic capacitor Cpar of the light emitting element LD) may be pre-charged. Accordingly, the light emitting element LD may emit light with a fast response speed, and the luminance non-uniformity phenomenon according to a deterioration deviation of the light emitting element LD may be accounted for (e.g., luminance non-uniformity may be reduced or removed).

In an embodiment, a second voltage level of the second initialization voltage Vint2 may be higher than the first voltage level. The second voltage level of the second initialization voltage Vint2 may be set in consideration of the threshold voltage of the light emitting element LD. For example, when a difference between the second voltage level of the second initialization voltage Vint2 and the second power voltage VSS exceeds the threshold voltage of the light emitting element LD, since the light emitting element LD may unintentionally emit light in the non-emission period, a maximum value of a voltage level that may be set as the second voltage level of the second initialization voltage Vint2 may be less than a value obtained by adding the threshold voltage of the light emitting element LD and the second power voltage VSS. For example, the second voltage level of the second initialization voltage Vint2 may have a voltage level that is about 1V to about 2V higher than the first voltage level. However, this is merely an example, and the second voltage level of the second initialization voltage Vint2 may be variously set according to embodiments of the present disclosure.

The eighth transistor M8 may be connected between the first node N1 (or the first electrode of the first transistor M1) and a fifth power line PL5 providing the bias voltage VEH. A gate electrode of the eighth transistor M8 may be connected to the first scan line S1*i*.

The eighth transistor M8 may be turned on when the first scan signal is supplied to the first scan line S1*i* to supply the bias voltage VEH to the first node N1. In an embodiment, the bias voltage VEH may have a level similar to a voltage level of a data signal of a black grayscale. For example, the bias voltage VEH may have a voltage level of about 5 to about 7V.

Accordingly, a predetermined high voltage may be applied to the first electrode (for example, the source electrode) of the first transistor M1 by the turning on of the eighth transistor M8. At this time, when the third transistor M3 is in a turn-off state, the first transistor M1 may have an on-bias state (a state in which the first transistor M1 may be turned on) (that is, on-biased).

Here, as the bias voltage VEH is periodically supplied to the first node N1, the bias state of the first transistor M1 may be periodically changed, and a threshold voltage characteristic of the first transistor M1 may be changed. Therefore, a characteristic of the first transistor M1 may be prevented from being fixed to a specific state and from being deteriorated in the low-frequency driving.

The first capacitor Cst (for example, the storage capacitor) may be connected between the first power line PL1 and the third node N3. As one electrode of the storage capacitor Cst is connected to the first power line PL1, the first power voltage VDD, which is a constant voltage, may be continuously supplied to the one electrode of the storage capacitor Cst. Therefore, the voltage of the third node N3 may be maintained as a voltage level of a voltage directly supplied to the third node N3 without being affected by another parasitic capacitor. That is, the first capacitor Cst may store the voltage applied to the third node N3.

According to embodiments, the first transistor M1, the second transistor M2, the fifth transistor M5, the sixth transistor M6, the seventh transistor M7, and the eighth transistor M8 may be formed of a polysilicon semiconductor transistor. For example, the first transistor M1, the second transistor M2, the fifth transistor M5, the sixth transistor M6, the seventh transistor M7, and the eighth transistor M8 may include a polysilicon semiconductor layer formed through a low temperature polysilicon (LTPS) process as an active layer (channel). In addition, the first transistor M1, the second transistor M2, the fifth transistor M5, the sixth transistor M6, the seventh transistor M7, and the eighth transistor M8 may be a P-type transistor (for example, a PMOS transistor). Accordingly, a gate-on voltage that turns on the first transistor M1, the second transistor M2, the fifth transistor M5, the sixth transistor M6, the seventh transistor M7, and the eighth transistor M8 may be a logic low level.

Since the polysilicon semiconductor transistor has a fast response speed, the polysilicon semiconductor transistor may be applied to a switching element utilizing fast switching.

The third transistor M3 and the fourth transistor M4 may be formed of an oxide semiconductor transistor. For example, the third transistor M3 and the fourth transistor M4 may be an N-type oxide semiconductor transistor (for example, an NMOS transistor), and may include an oxide semiconductor layer as an active layer. Accordingly, a gate-on voltage that turns on the third transistor M3 and the fourth transistor M4 may be a logic high level.

The oxide semiconductor transistor may be processed at a low temperature and has a charge mobility lower than that of a polysilicon semiconductor transistor. That is, the oxide semiconductor transistor has an excellent off current characteristic. Therefore, when the third transistor M3 and the fourth transistor M4 are formed of an oxide semiconductor transistor, a leakage current from the second node N2 according to the low-frequency driving may be minimized or reduced, and thus, display quality may be increased.

However, the first to eighth transistors M1 to M8 are not limited thereto. For example, according to embodiments of the present disclosure, at least one of the first transistor M1, the second transistor M2, the fifth transistor M5, the sixth transistor M6, the seventh transistor M7, and the eighth transistor M8 may be formed of an oxide semiconductor transistor, or at least one of the third transistor M3 and the fourth transistor M4 may be formed of a polysilicon semiconductor transistor.

Figure 4:
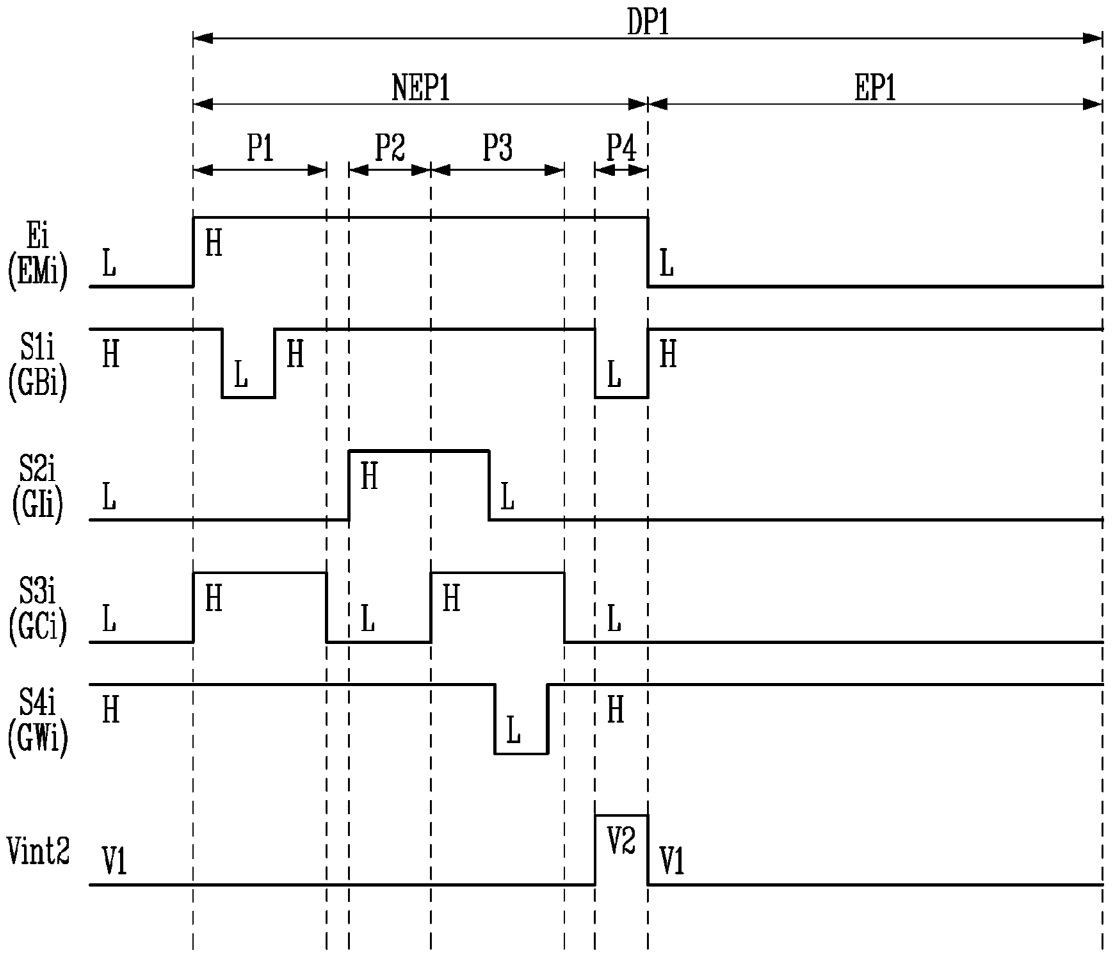
FIG. 4 is a timing diagram illustrating an example of signals supplied to the pixel of FIG. 3 during a first driving period.
Figure 5A:
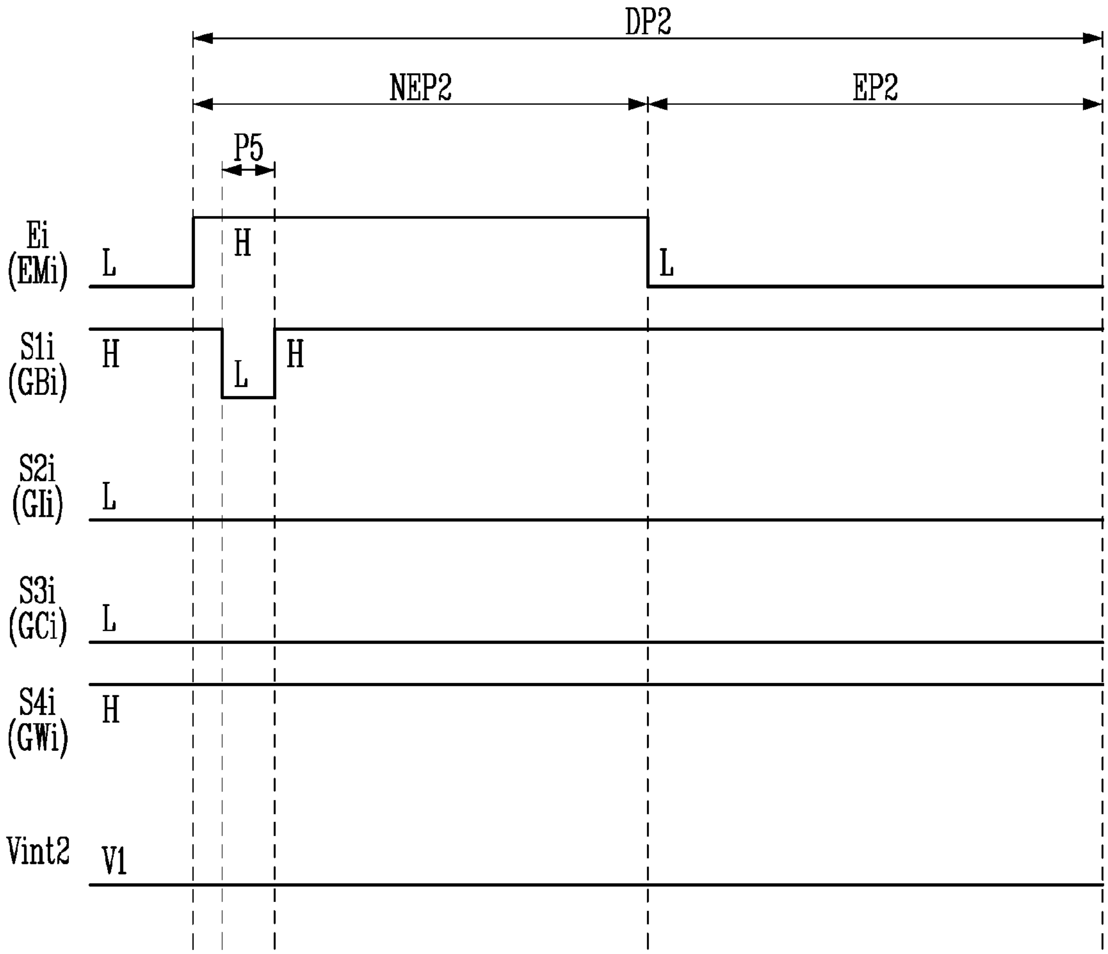
FIGS. 5A and 5B are timing diagrams illustrating an example of signals supplied to the pixel of FIG. 3 during a second driving period.
Figure 5B:
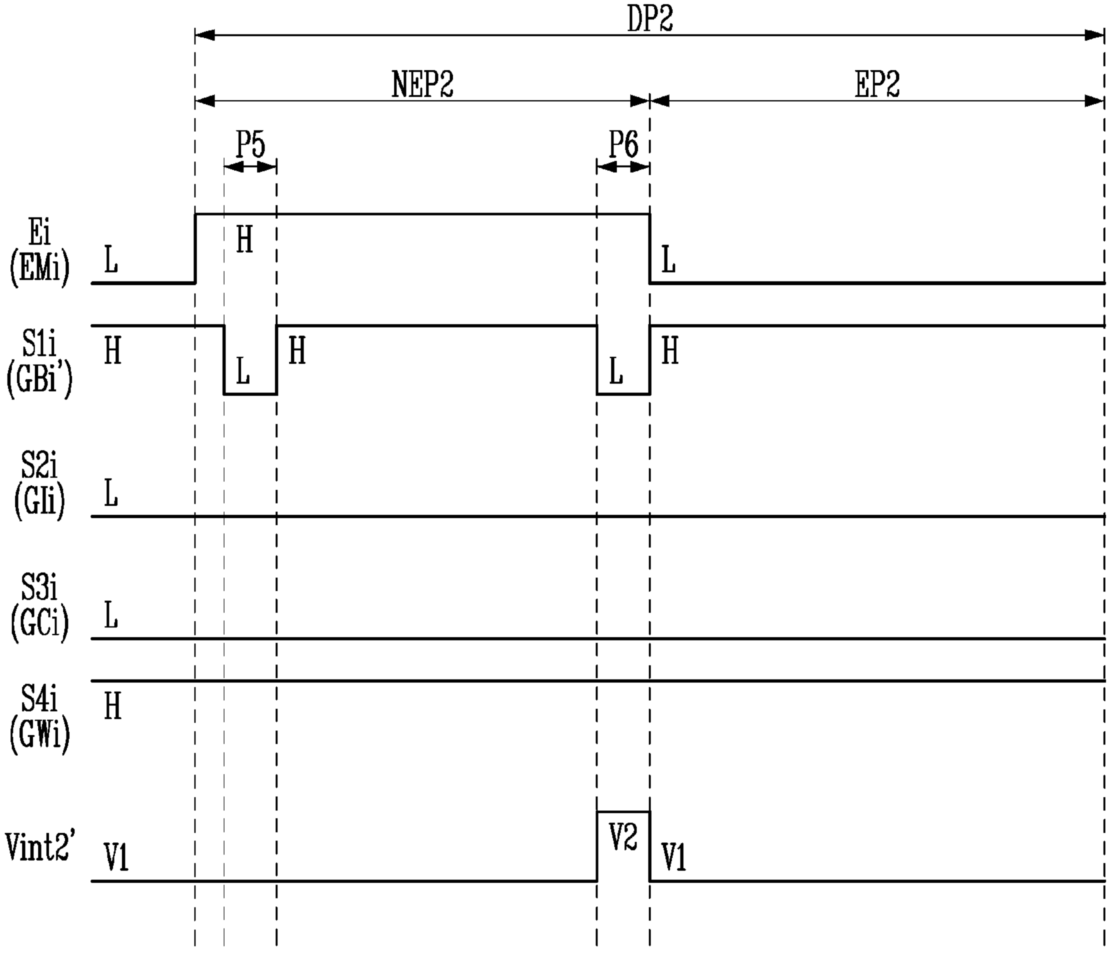

FIG. 4 is a timing diagram illustrating an example of signals supplied to the pixel of FIG. 3 during the first driving period. FIGS. 5A and 5B are timing diagrams illustrating an example of signals supplied to the pixel of FIG. 3 during the second driving period.

Referring to FIGS. 3, 4, 5A, and 5B, the pixel PX may operate through a first driving period DP1 or a second driving period DP2.

In variable frequency driving for controlling a frame frequency, one frame period may include the first driving period DP1. In addition, the second driving period DP2 may be omitted or may proceed at least once according to the frame frequency.

The first driving period DP1 may include a first non-emission period NEP1 and a first emission period EP1. The second driving period DP2 may include a second non-emission period NEP2 and a second emission period EP2. Here, the first and second non-emission periods NEP1 and NEP2 may mean a period in which a path of the driving current flowing from the first power line PL1 to the second power line PL2 via the light emitting element LD is blocked, and the first and second emission periods EP1 and EP2 may mean a period in which the path of the driving current is formed and the light emitting element LD emits light based on the driving current.

The first driving period DP1 may include a period in which a data signal actually corresponding to an output image is written. For example, when a still image is displayed by low-frequency driving, the data signal may be written in every first driving period DPL. In the second driving period DP2, the data signal may not be supplied, and a first scan signal line GBi may be supplied to the first scan line S1*i* to control the first transistor M1 of the pixel PX to be in an on-bias state and initialize the light emitting element LD.

As shown in FIGS. 4 and 5A, the first non-emission period NEP1 may include first to fourth periods P1 to P4, and the second non-emission period NEP2 may include a fifth period P5.

In an embodiment, second to fourth scan signals GIi, GCi, and GWi supplied to the respective second to fourth scan lines S2*i*, S3*i*, and S4*i* may be supplied only during the first non-emission period NEP1. According to embodiments, the third scan signal GCi may be supplied a plurality of times during the first non-emission period NEP1.

In an embodiment, the first scan signal GBi supplied to the first scan line S1*i* may be supplied during the first non-emission period NEP1 and the second non-emission period NEP2.

As shown in FIG. 4, the first scan signal GBi may be supplied to the first scan line S1*i* a plurality of times during the first non-emission period NEP1. In addition, as shown in FIG. 5A, the first scan signal GBi may be supplied to the first scan line S1*i* once in the second non-emission period NEP2. However, the present disclosure is not limited thereto. For example, as shown in FIG. 5B, in an embodiment, the first scan signal GBi may be supplied to the first scan line S1*i* a plurality of times (for example, twice as shown in FIG. 5B) during the second non-emission period NEP2.

In an embodiment, each of the first scan signal GBi and the fourth scan signal GWi may overlap the third scan signal GCi in at least a partial period.

The second scan signal GIi and the third scan signal GCi supplied to the n-type oxide semiconductor transistor (for example, the third transistor M3 and the fourth transistor M4) may be a high level H, and the first scan signal GBi and the fourth scan signal GWi supplied to the p-type polysilicon semiconductor transistors (for example, the second transistor M2, the seventh transistor M7, and the eighth transistor M8) may be a low level L.

According to embodiments, the first to fourth scan signals GBi, GCi, GIi, and GWi may be supplied from a scan driver (for example, the scan driver 200 of FIG. 1). For example, the first to fourth scan signals GBi, GCi, GIi, and GWi may be supplied from the first to fourth scan drivers 210, 220, 230, and 240 of FIG. 2, respectively.

An emission control signal EMi supplied to the emission control line Ei may be maintained as the high level H (or a gate-off level) during the first non-emission period NEP1 of the first driving period DP1, and may be maintained as the high level H (or the gate-off level) during the second non-emission period NEP2 of the second driving period DP2. Accordingly, each of the fifth transistor M5 and the sixth transistor M6 may maintain a turn-off state during the first non-emission period NEP1 and the second non-emission period NEP2. Accordingly, the path of the driving current flowing from the first power line PL1 to the second power line PL2 via the light emitting element LD may be blocked during the first non-emission period NEP1 and the second non-emission period NEP2.

In an embodiment, in the first non-emission period NEP1 of the first driving period DP1, the voltage level of the second initialization voltage Vint2 may vary. For example, as shown in FIG. 4, the second initialization voltage Vint2 may have a second voltage level V2 in the fourth period P4 of the first non-emission period NEP1 of the first driving period DP1, and may have a first voltage level V1 in other periods (for example, first to third periods P1, P2, and P3 of the first non-emission period NEP1 and the first emission period EP1). Here, the second voltage level V2 may be higher than the first voltage level V1.

In an embodiment, the voltage level of the second initialization voltage Vint2 may be maintained constant in the second driving period DP2. For example, as shown in FIG. 5A, the second initialization voltage Vint2 may be maintained as the first voltage level V1 during the second driving period DP2.

However, the present disclosure is not limited thereto. For example, in an embodiment, the second voltage level of the second initialization voltage Vint2 may vary in the second non-emission period NEP2 of the second driving period DP2 similarly to that in the first driving period DP1. For example, as shown in FIG. 5B, the second initialization voltage Vint2 may have the second voltage level V2 in the sixth period P6 of the second non-emission period NEP2 of the second driving period DP2 and may have the first voltage level V1 in other periods (for example, the fifth period P5 of the second non-emission period NEP2 and the second emission period EP2).

Hereinafter, the scan signals GBi, GIi, GCi, and GWi supplied in the first driving period DP1 and the second driving period DP2 and an operation of the pixel PX are described in detail with reference to FIGS. 3, 4, 5A, and 5B.

First, referring to FIGS. 3 and 4 to describe the first driving period DP1, the emission control line EMi of the high level H (or the gate-off level) may be supplied to the emission control line Ei during the first non-emission period NEP1. Accordingly, the fifth transistor M5 and the sixth transistor M6 may be turned off during the first non-emission period NEP1. The first non-emission period NEP1 may include first to fourth periods P1 to P4.

In the first period P1, the third scan signal GCi may be supplied to the third scan line S3*i* and the first scan signal GBi may be supplied to the first scan line S1*i*. In an embodiment, after the third scan signal GCi is supplied, the first scan signal GBi may be supplied. Therefore, after the third transistor M3 is turned on in the first period P1, the eighth transistor M8 may be turned on.

When only the eighth transistor M8 is turned on without supply of the third scan signal GCi, the bias voltage VEH may be supplied to the first node N1 (that is, the source electrode of the first transistor M1). At this time, the high voltage of bias voltage VEH may be applied to the first node N1, and thus, the first transistor M1 may have the on-bias state. For example, when the bias voltage VEH is about 5V or more, the first transistor M1 may have a source voltage and a drain voltage of about 5V or more, and an absolute value of a gate-source voltage of the first transistor M1 may increase.

In such a state, when the data signal is supplied by the supply of the fourth scan signal GWi, the driving current may unintentionally change due to an influence of the bias state of the first transistor M1, and an image luminance may be affected (for example, the luminance may increase).

To account for this, in the first period P1, the scan driver (for example, the scan driver 200 of FIG. 1) may first supply the third scan signal GCi prior to the first scan signal GBi. Therefore, the third transistor M3 may be turned on prior to the eighth transistor M8. The second node N2 and the third node N3 may conduct by the turning on of the third transistor M3. Thereafter, when the eighth transistor M8 is turned on, the bias voltage VEH may be transmitted to the third node N3 through the first node N1. For example, a voltage difference between the first node N1 and the third node N3 may be decreased to a threshold voltage level of the first transistor M1. Therefore, in the first period P1, a magnitude of the gate-source voltage of the first transistor M1 may be greatly decreased. For example, the first transistor M1 may be set to an off-bias state.

As described above, to prevent or reduce an unintentional luminance increase due to the supply of the bias voltage VEH before the data signal is written in the first period P1, the supply of the first scan signal GBi and the third scan signal GCi may be controlled so that the eighth transistor M8 is turned on in a state in which the third transistor M3 is turned on.

In an embodiment, in the first period P1, a width of the third scan signal GCi (for example, a width of a period in which the third scan signal GCi is supplied as the high level H) may be greater than a width of the first scan signal GBi (for example, a width of a period in which the first scan signal GBi is supplied as the low level L). For example, in the first period P1, the third transistor M3 may be turned on prior to the eighth transistor M8, and after the eighth transistor M8 is turned off, the third transistor M3 may be turned off.

However, this is merely an example, and the third transistor M3 may be turned off prior to the eighth transistor M8 in an embodiment.

According to embodiments, in the first period P1, the second initialization voltage Vint2 having the first voltage level V1 may be supplied to the fourth power line PL4. During a period in which the first scan signal GBi of the low level L (or a gate-on level) is supplied in the first period P1, the seventh transistor M7 may be turned on in response to the first scan signal GBi, and the second initialization voltage Vint2 having the first voltage level V1 may be supplied to the first electrode (that is, the fourth node N4) of the light emitting element LD. Accordingly, the first electrode of the light emitting element LD may be initialized based on the first voltage level V1 of the second initialization voltage Vint2. That is, the parasitic capacitor Cpar of the light emitting element LD may be discharged by the second initialization voltage Vint2 having the first voltage level V1. Accordingly, the black expression ability of the pixel PX may be increased.

Thereafter, in the second period P2, the second scan signal GIi may be supplied to the second scan line S2*i*. The fourth transistor M4 may be turned on by the second scan signal GIi. When the fourth transistor M4 is turned on, the first initialization voltage Vint1 may be supplied to the gate electrode of the first transistor M1. That is, in the second period P2, a gate voltage of the first transistor M1 may be initialized based on the first initialization voltage Vint1. Therefore, a strong on-bias may be applied to the first transistor M1, and the hysteresis characteristic may be changed (the threshold voltage may be shifted).

According to embodiments, the supply of the second scan signal GIi may be maintained after the second period P2. For example, as shown in FIG. 4, the second scan signal GIi may maintain the high level H (or the gate-on level) during at least a portion of the third period P3 after the second period P2. However, the present disclosure is not limited thereto, and the second scan signal GIi may transition from the high level H to the low level L in response to a time point at which the second period P2 is ended.

Thereafter, in the third period P3, the third scan signal GCi may be supplied to the third scan line S3*i*. The third transistor M3 may be turned on again in response to the third scan signal GCi. In the third period P3, the fourth scan signal GWi may be supplied to the fourth scan line S4*i* while overlapping a portion of the third scan signal GCi. The second transistor M2 may be turned on by the fourth scan signal GWi, and the data signal may be provided to the first node N1.

At this time, the first transistor M1 may be connected in a diode form by the turned-on third transistor M3, and data signal writing and threshold voltage compensation may be performed. According to embodiments, since the third scan signal GCi is supplied before the fourth scan signal GWi is supplied and after the supply of the fourth scan signal GWi is stopped, the threshold voltage of the first transistor M1 may be compensated during a sufficient time.

Thereafter, in the fourth period P4, the first scan signal GBi may be supplied to the first scan line S1*i* again. Therefore, the seventh transistor M7 and the eighth transistor M8 may be turned on. The bias voltage VEH may be supplied to the first node N1 by the turning on of the eighth transistor M8.

An influence of the strong on-bias applied in the second period P2 may be removed or reduced by an operation of writing the data signal and an operation of compensating for a threshold voltage. For example, the voltage difference between the gate voltage and the source voltage (and the drain voltage) of the first transistor M1 may be greatly reduced by the threshold voltage compensation in the third period P3. Then, the characteristic of the first transistor M1 may be changed again, and the driving current of the first emission period EP1 may increase or birdcaging of a black grayscale may be visually recognized.

To prevent or reduce such a characteristic change, the eighth transistor M8 may be turned on by the supply of the first scan signal GBi in the fourth period P4. Therefore, as the bias voltage VEH is supplied to the first electrode (for example, the source electrode) of the first transistor M1 in the fourth period P4, the first transistor M1 may be set to the on-bias state.

In the fourth period P4, the second initialization voltage Vint2 having the second voltage level V2 may be supplied to the fourth power line PL4. Since the second initialization voltage Vint2 has the second voltage level V2 in the fourth period P4 in which the first scan signal GBi is supplied, the second initialization voltage Vint2 having the second voltage level V2 may be supplied to the first electrode (or the fourth node N4) of the light emitting element LD. Accordingly, the light emitting element LD may be pre-charged to the second voltage level V2. For example, the parasitic capacitor Cpar of the light emitting element LD may be charged with the second initialization voltage Vint2 having the second voltage level V2. As described above, in the fourth period P4 immediately before the first emission period EP1 in which the light emitting element LD emits light, the light emitting element LD may be pre-charged to the second voltage level V2 higher than the first voltage level V1 for initializing the light emitting element LD. That is, since the parasitic capacitor Cpar of the light emitting element LD is pre-charged immediately before the first emission period EP1, a current amount utilized to charge the light emitting element LD (or the parasitic capacitor Cpar of the light emitting element LD) at the initial stage of the first emission period EP1 may be reduced. Accordingly, the light emitting element LD may emit light with a fast response speed.

According to embodiments, when the light emitting element LD is deteriorated according to long term driving of the display device (for example, the display device 1000 of FIG. 1), a capacitance of the parasitic capacitor Cpar of the light emitting element LD may decrease. At this time, a difference in a deterioration degree may exist for each light emitting element LD, and luminance uniformity may be reduced due to the deterioration deviation of the light emitting element LD between the pixels PX. For example, in a case of the pixel PX in which the deterioration of the light emitting element LD is not progressed relatively, a decrease amount of the capacitance of the parasitic capacitor Cpar of the light emitting element LD may be relatively small, whereas in a case of the pixel PX in which the deterioration of the light emitting element LD is greatly progressed relatively, the decrease amount of the capacitance of the parasitic capacitor Cpar of the light emitting element LD may be relatively great. Here, in a low luminance area where the current amount supplied from the first transistor M1 to the light emitting element LD is relatively small, a current amount for charging the light emitting element LD (for example, the parasitic capacitor Cpar of the light emitting element LD) may be relatively small. In this case, in the pixel PX in which the deterioration of the light emitting element LD is not progressed relatively, since the capacitance of the parasitic capacitor Cpar of the light emitting element LD is relatively high, and thus, a charge rate by the current supplied to the light emitting element LD is low, a luminance of light emitted by the light emitting element LD may be relatively low. On the other hand, in the pixel PX in which the deterioration of the light emitting element LD is greatly progressed relatively, since the capacitance of the parasitic capacitor Cpar of the light emitting element LD is relatively low, and thus, the charge rate may be relatively high even though the current amount supplied to the light emitting element LD is relatively low, the luminance of the light emitted by the light emitting element LD may be relatively high.

In the pixel PX (and the display device 1000 including the pixel PX) according to embodiments of the present disclosure, since the light emitting element LD (for example, the parasitic capacitance Cpar of the light emitting element LD) is pre-charged by the second initialization voltage Vint2 having the second voltage level V2 immediately before the emission period (for example, the first emission period EP1 of the first driving period DP1), the luminance non-uniformity phenomenon according to the deterioration deviation of the light emitting element LD may be accounted for (e.g., luminance non-uniformity may be reduced or removed) even in a low luminance area where the current amount supplied to the light emitting element LD is relatively low.

After the fourth period P4, the supply of the emission control signal EMi to the emission control line Ei may be stopped (for example, the emission control signal EMi may transition to the low level L). Therefore, the first non-emission period NEP1 may be ended and the first emission period EP1 may proceed. In the first emission period EP1, the fifth and sixth transistors M5 and M6 may be turned on.

In the first emission period EP1, a driving current corresponding to a data signal written in the third period P3 may be supplied to the light emitting element LD, and the light emitting element LD may emit light based on the driving current.

Next, referring to FIGS. 3 and 5A to describe the second driving period DP2, as shown in FIG. 5A, the second driving period DP2 may include a second non-emission period NEP2 and a second emission period EP2, and the second non-emission period NEP2 may include a fifth period P5.

In an embodiment, a waveform of the emission control signal EMi in the second driving period DP2 may be substantially the same as a waveform of the emission control signal EMi in the first driving period DP1.

In an embodiment, as shown in FIG. 5A, the second initialization voltage Vint2 may be maintained as the first voltage level V1 during the second driving period DP2.

In an embodiment, in the second driving period DP2, the second to fourth scan signals GIi, GCi, and GWi may not be supplied. For example, in the second driving period DP2, the second and third scan signals GIi and GCi of the low level L (or the gate-off level) may be supplied to the second and third scan lines S2*i* and S3*i*, respectively, and the fourth scan signal GWi of the high level H (or the gate-off level) may be supplied to the fourth scan line S4*i*. Accordingly, in the second driving period DP2, the second to fourth transistors M2, M3, and M4 may maintain a turn-off state.

In the fifth period P5 of the second non-emission period NEP2, the first scan signal GBi may be supplied to the first scan line S1*i*. For example, in the fifth period P5, the first scan signal GBi of the low level L (or the gate-on level) may be supplied to the first scan line S1*i*. Accordingly, the seventh and eighth transistors M7 and M8 may be turned on.

Since the seventh transistor M7 is turned on in the fifth period P5, the second initialization voltage Vint2 having the first voltage level V1 may be supplied to the first electrode (that is, the fourth node N4) of the light emitting element LD. Accordingly, the first electrode of the light emitting element LD may be initialized based on the first voltage level V1 of the second initialization voltage Vint2.

In addition, since the eighth transistor M8 is turned on in the fifth period P5, the bias voltage VEH may be supplied to the first electrode (or the first node N1) of the first transistor M1.

After the fifth period P5, the supply of the emission control signal EMi to the emission control line Ei may be stopped (for example, the emission control signal EMi may transition to the low level L). Therefore, the second emission period NEP2 may be ended and the second emission period EP2 may proceed. In the second emission period EP2, the fifth and sixth transistors M5 and M6 may be turned on.

In the second emission period EP2, a driving current corresponding to a data signal written in the first driving period DP1 may be supplied to the light emitting element LD, and the light emitting element LD may emit light based on the driving current.

According to embodiments, in FIG. 5A, the first scan signal GBi is supplied to the first scan line S1*i* once, but the present disclosure is not limited thereto.

For example, referring further to FIG. 5B, in an embodiment, the second non-emission period NEP2 may further include a sixth period P6.

In the sixth period P6, a first scan signal GBi' of the low level L (for example, the gate-on level) may be supplied to the first scan line S1*i*, and a second initialization voltage Vint2' may vary from the first voltage level V1 to the second voltage level V2. That is, the second initialization voltage Vint2' having the second voltage level V2 may be supplied to the first electrode (that is, the fourth node N4) of the light emitting element LD, by the seventh transistor M7 turned on by the first scan signal GBi' in the sixth period P6. Accordingly, the light emitting element LD (for example, the parasitic capacitor Cpar of the light emitting element LD) may be pre-charged in the sixth period P6 immediately before the second emission period EP2. Here, an operation of the pixel PX in the sixth period P6 may be substantially identical or similar to the operation of the pixel PX in the fourth period P4 described with reference to FIG. 4.

Figure 6A:
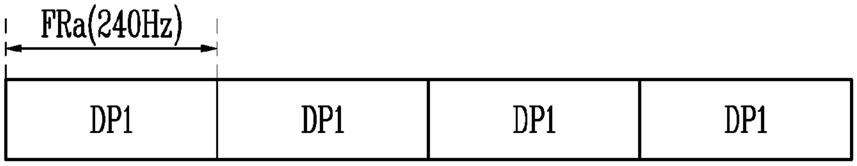
FIGS. 6A, 6B and 6C are diagrams illustrating an example of driving of the display device of FIG. 1 according to a frame frequency.
Figure 6B:
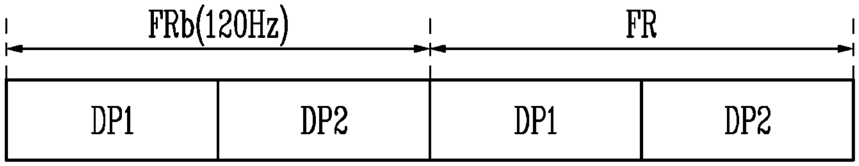
Figure 6C:
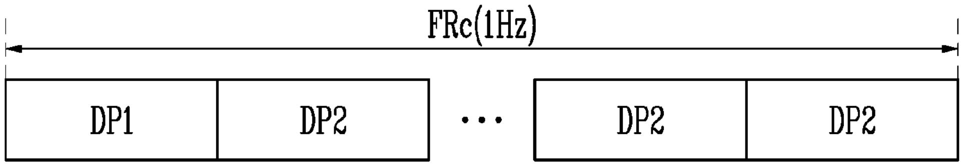

FIGS. 6A, 6B and 6C are diagrams illustrating an example of driving of the display device of FIG. 1 according to the frame frequency.

Referring to FIGS. 1, 4, 5A, 5B, and 6A to 6C, the display device 1000 may be driven at various frame frequencies.

A frequency of the first driving period DP1 may correspond to the frame frequency.

In an embodiment, as shown in FIG. 6A, a first frame FRa may include the first driving period DP1. For example, when the frequency of the first driving period DP1 is about 240 Hz, the first frame FRa may be driven at about 240 Hz. For example, a length of the first driving period DP1 and the first frame FRa may be about 4.17 ms.

In an embodiment, as shown in FIG. 6B, a second frame FRb may include the first driving period DP1 and one second driving period DP2. For example, the first driving period DP1 and the second driving period DP2 may be repeated. In this case, the second frame FRb may be driven at about 120 Hz. For example, a length of the first driving period DP1 and one second driving period DP2 may be about 4.17 ms, and a length of the second frame FRb may be about 8.33 ms.

In an embodiment, as shown in FIG. 6C, a third frame FRc may include one first driving period DP1 and a plurality of repeated second driving periods DP2. For example, when the third frame FRc is driven at about 1 Hz, a length of the third frame FRc may be about 1 second, and the second driving period DP2 may be repeated about 239 times within the third frame FRc.

As described above, by controlling the number of repetitions of the second driving period DP2 within one frame, the display device 1000 may be freely driven at various frame frequencies (for example, about 1 Hz to about 480 Hz).

Figure 7A:
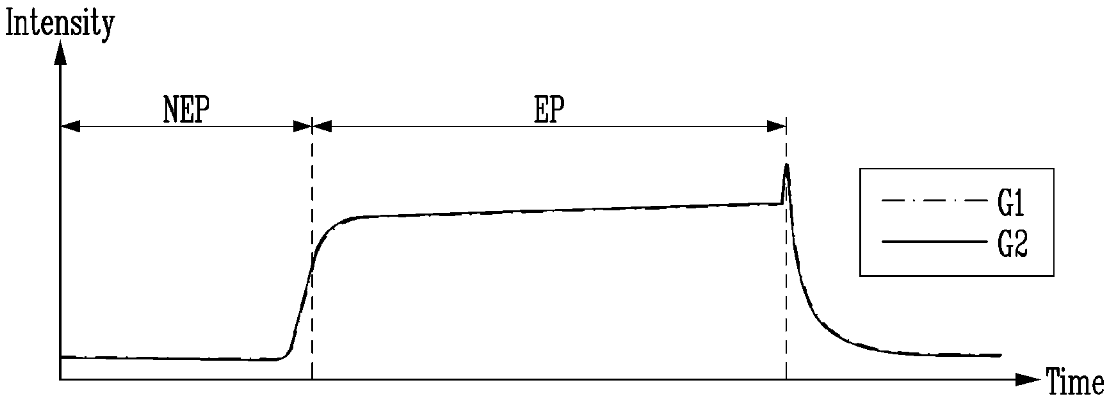
FIG. 7A is a graph illustrating an example of a luminance change of light emitted from a light emitting element included in the pixel of FIG. 3 according to an example embodiment of the present disclosure.
Figure 7B:
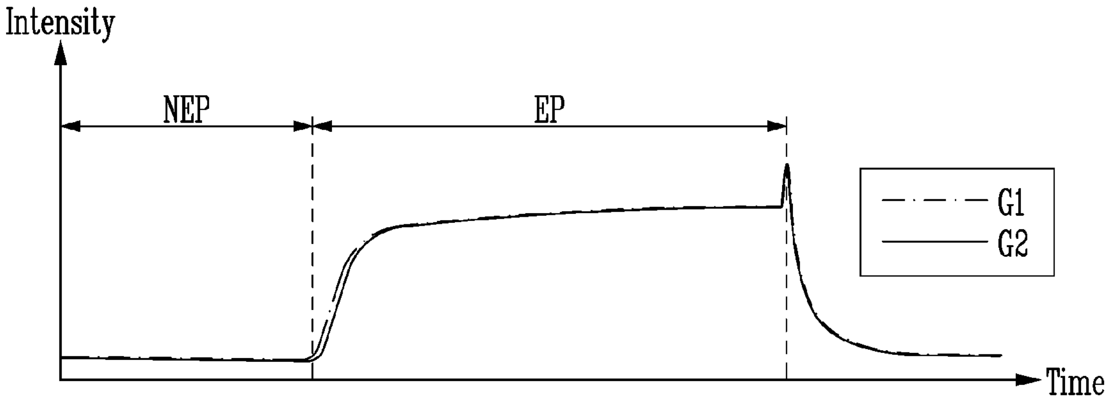
FIG. 7B is a graph illustrating an example of a luminance change of light emitted from a light emitting element included in a pixel according to a comparative example.

FIG. 7A is a graph illustrating an example of a luminance change of the light emitted from the light emitting element included in the pixel of FIG. 3 according to an embodiment of the present disclosure. FIG. 7B is a graph illustrating an example of a luminance change of light emitted from a light emitting element included in a pixel according to a comparative example.

FIG. 7A shows graphs G1 and G2 for an intensity of a luminance according to a time when the light emitting element LD is pre-charged in the non-emission period NEP (for example, the first non-emission period NEP1 and the second non-emission period NEP2) immediately before the emission period EP (for example, the first emission period EP1 and the second emission period EP2), as described with reference to FIGS. 3 to 5B. FIG. 7B shows the graphs G1 and G2 of the intensity of the luminance according to the time when the light emitting element LD is not pre-charged.

The first graph G1 shown in each of FIGS. 7A and 7B indicates a graph of the intensity of the luminance after the display device (for example, the display device 1000 of FIG. 1) is driven for a long time, and the second graph G2 shown in each of FIG. 7A and FIG. 7B indicates a graph of the intensity of the luminance during initial driving of the display device (for example, the display device 1000 of FIG. 1).

Referring to FIG. 7A, as described with reference to FIGS. 1 and 3 to 5B, in the non-emission period NEP, the light emitting element LD (for example, the parasitic capacitor Cpar of the light emitting element LD) included in the pixel PX may be pre-charged. In this case, the luminance after the display device 1000 is driven for a long time may be substantially the same as the luminance during the initial driving of the display device 1000. For example, as shown in FIG. 7A, the first graph G1 and the second graph G2 indicating the change of the luminance in the non-emission period NEP and the emission period EP may indicate substantially the same shape.

On the other hand, referring to FIG. 7B, when the light emitting element is not pre-charged in the non-emission period NEP as in the comparative example, the luminance after the display device is driven for a long time may be different from the luminance during the initial driving. For example, as described with reference to FIGS. 3 to 5B, since the capacitance of the parasitic capacitor of the light emitting element is reduced due to the deterioration of the light emitting element, the parasitic capacitor may be charged even with a relatively small current amount, and thus, the luminance of the light emitted from the light emitting element may be relatively high. For example, as shown in FIG. 7B, the first graph G1 indicating the luminance change after driving for a long time and the second graph G2 indicating the luminance change during the initial driving may indicate different shapes in the emission period EP in which the driving current is supplied to the light emitting element. That is, when the display device is driven for a long time with respect to the same display image, the luminance may be displayed differently according to a capacitance difference of the parasitic capacitor of the light emitting element, and the luminance may be displayed non-uniformly for each pixel according to the deterioration deviation of the light emitting element.

The pixel and the display device including the same according to embodiments of the present disclosure may pre-charge a light emitting element in a non-emission period immediately before an emission period by varying a voltage level of a second initialization voltage. Accordingly, a luminance non-uniformity phenomenon according to a deterioration deviation of the light emitting element may be accounted for (e.g., luminance non-uniformity may be reduced or removed).

However, an effect of the present disclosure is not limited to the above-described effect.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

Although the present disclosure has been described with reference to embodiments thereof, it will be understood by those of ordinary skill in the art that various changes in form and detail may be made therein without departing from the spirit and scope of the present disclosure as defined by the following claims.

What is claimed is:

1. A pixel, comprising:

a light emitting element;

a first transistor connected between a first node and a second node and configured to generate a driving current flowing from a first power line providing a first power voltage to a second power line providing a second power voltage through the light emitting element;

a second transistor connected between a data line and the first node and configured to be turned on in response to a fourth scan signal supplied to a fourth scan line;

a third transistor connected between the second node and a third node corresponding to a gate electrode of the first transistor and configured to be turned on in response to a third scan signal supplied to a third scan line;

a fourth transistor connected between the third node and a third power line providing a third power voltage and configured to be turned on in response to a second scan signal supplied to a second scan line;

a fifth transistor connected between the first power line and the first node and configured to be turned off in response to an emission control signal supplied to an emission control line;

a sixth transistor connected between the second node and a fourth node corresponding to a first electrode of the light emitting element and configured to be turned off in response to the emission control signal;

a seventh transistor connected between the fourth node and a fourth power line providing a fourth power voltage and configured to be turned on in response to a first scan signal supplied to a first scan line; and an eighth transistor connected between the first node and a fifth power line providing a fifth power voltage and configured to be turned on in response to the first scan signal, wherein, during one frame period, the first scan signal is supplied to the first scan line at least twice during a first non-emission period and at least once during a second non-emission period, and wherein, in the one frame period, a voltage level of the fourth power voltage varies, wherein the one frame period comprises:

a first driving period in which the fourth scan signal is supplied to the second transistor, a data signal supplied to the data line is written, and the first scan signal is supplied to the eighth transistor; and a second driving period in which the fourth scan signal is not supplied to the second transistor and the first scan signal is supplied to the eighth transistor.

2. The pixel according to claim 1, wherein the first driving period comprises:

a first period in which the third scan signal is supplied to the third transistor and the first scan signal is supplied to the seventh transistor and the eighth transistor;

a second period in which the second scan signal is supplied to the fourth transistor after the first period;

a third period in which the third scan signal is supplied to the third transistor and the fourth scan signal is supplied to the second transistor after the second period; and a fourth period in which the first scan signal is supplied to the seventh transistor and the eighth transistor after the third period.

3. The pixel according to claim 2, wherein the fourth power voltage has a first voltage level in the first to third periods and a second voltage level different from the first voltage level in the fourth period.

4. The pixel according to claim 3, wherein the second voltage level is greater than the first voltage level.

5. The pixel according to claim 4, wherein the second voltage level is less than a value obtained by adding a threshold voltage of the light emitting element and the second power voltage.

6. The pixel according to claim 2, wherein a width of the third scan signal is greater than a width of the first scan signal in the first period.

7. The pixel according to claim 1, wherein the second driving period comprises a first period in which the first scan signal is supplied to the seventh transistor and the eighth transistor.

8. The pixel according to claim 7, wherein the fourth power voltage is maintained as a first voltage level during the second driving period.

9. The pixel according to claim 7, wherein the second driving period further comprises a second period in which the first scan signal is supplied to the seventh transistor and the eighth transistor after the first period.

10. The pixel according to claim 9, wherein the fourth power voltage has a first voltage level in the first period and a second voltage level different from the first voltage level in the second period.

11. A display device, comprising:

a pixel connected to first to fourth scan lines, an emission control line, a data line, and first to fifth power lines;

a scan driver configured to supply first to fourth scan signals to the first to fourth scan lines, respectively;

an emission driver configured to supply an emission control signal to the emission control line;

a data driver configured to supply a data signal to the data line; and a power supply configured to supply first to fifth power voltages to the first to fifth power lines, respectively, wherein the pixel comprises:

a light emitting element;

a first transistor connected between a first node and a second node and configured to generate a driving current flowing from the first power line to the second power line through the light emitting element;

a second transistor connected between the data line and the first node and configured to be turned on in response to the fourth scan signal;

a third transistor connected between the second node and a third node corresponding to a gate electrode of the first transistor and configured to be turned on in response to the third scan signal;

a fourth transistor connected between the third node and the third power line and configured to be turned on in response to the second scan signal;

a fifth transistor connected between the first power line and the first node and configured to be turned off in response to the emission control signal;

a sixth transistor connected between the second node and a fourth node corresponding to a first electrode of the light emitting element and configured to be turned off in response to the emission control signal;

a seventh transistor connected between the fourth node and the fourth power line and configured to be turned on in response to the first scan signal; and an eighth transistor connected between the first node and the fifth power line and configured to be turned on in response to the first scan signal, wherein the scan driver supplies the first scan signal to the first scan line at least twice during a first non-emission period and at least once during a second non-emission period during one frame period, wherein the power supply varies a voltage level of the fourth power voltage in the one frame period, wherein the one frame period comprises a first driving period and a second driving period, wherein, in the first driving period, the scan driver supplies the first scan signal through the first scan line and supplies the fourth scan signal through the fourth scan line, and wherein, in the second driving period, the scan driver supplies the first scan signal through the first scan line and does not supply the fourth scan signal.

12. The display device according to claim 11, wherein the first driving period comprises:

a first period in which the scan driver supplies the first scan signal to the first scan line and supplies the third scan signal to the third scan line;

a second period in which the scan driver supplies the second scan signal to the second scan line after the first period;

a third period in which the scan driver supplies the third scan signal to the third scan line and the fourth scan signal to the fourth scan line after the second period; and a fourth period in which the scan driver supplies the first scan signal to the first scan line after the third period.

13. The display device according to claim 12, wherein the power supply supplies the fourth power voltage having a first voltage level to the fourth power line in the first to third periods, and supplies the fourth power voltage having a second voltage level different from the first voltage level to the fourth power line in the fourth period.

14. The display device according to claim 13, wherein the second voltage level is greater than the first voltage level.

15. The display device according to claim 11, wherein the second driving period comprises a first period in which the scan driver supplies the first scan signal to the first scan line, and wherein the power supply supplies the fourth power voltage having a first voltage level to the fourth power line in the first period.

16. The display device according to claim 15, wherein the second driving period further comprises a second period in which the scan driver supplies the first scan signal to the first scan line after the first period, and wherein the power supply supplies the fourth power voltage having a second voltage level different from the first voltage level to the fourth power line in the second period.

* * * * *